United States Patent
Park et al.

(10) Patent No.: US 8,565,778 B2
(45) Date of Patent: Oct. 22, 2013

(54) APPARATUS AND METHOD FOR UPLINK SCHEDULING IN A BROADBAND WIRELESS COMMUNICATION SYSTEM

(75) Inventors: Jang-Won Park, Yongin-si (KR); Il-Jin Youn, Bucheon-si (KR); Byung-Chan Ahn, Seoul (KR); Jae-Ho Lee, Suwon-si (KR); Soo-Yeul Oh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1658 days.

(21) Appl. No.: 12/012,711

(22) Filed: Feb. 5, 2008

(65) Prior Publication Data

US 2008/0188232 A1    Aug. 7, 2008

(30) Foreign Application Priority Data

Feb. 5, 2007 (KR) .................. 10-2007-0011510

(51) Int. Cl.
*H04W 72/00* (2009.01)
(52) U.S. Cl.
USPC ............... 455/452.2; 455/450; 455/452.1
(58) Field of Classification Search
USPC ............ 455/450, 452.1, 452.2; 370/322, 329, 370/330, 341, 348
See application file for complete search history.

(56) References Cited

U.S. PATENT DOCUMENTS

| | | | | |
|---|---|---|---|---|
| 6,493,331 B1 * | 12/2002 | Walton et al. | ......... | 370/341 |
| 7,260,405 B2 * | 8/2007 | Kim et al. | ......... | 455/452.2 |
| 7,324,431 B2 * | 1/2008 | Lestable | ......... | 370/203 |
| 7,904,093 B2 * | 3/2011 | Nystrom et al. | ......... | 455/450 |

FOREIGN PATENT DOCUMENTS

| | | | |
|---|---|---|---|
| KR | 1020060004142 A | | 1/2006 |
| KR | 1020060038131 A | | 5/2006 |
| KR | 1020060107541 A | | 10/2006 |
| KR | 1020050123041 A | | 12/2006 |
| WO | WO 2005/046283 A1 | | 5/2005 |

* cited by examiner

Primary Examiner — Temica M Beamer

(57) ABSTRACT

An apparatus and method for uplink scheduling in a broadband wireless communication system are provided, in which channel conditions are divided into at least two areas, an area corresponding to channel information of a CSM mobile station received from the CSM mobile station is determined, resources of a first pilot pattern are allocated to the CSM mobile station, if the channel information belongs to an area with good channel condition, and resources of a second pilot pattern are allocated to the CSM mobile station, if the cannel information belongs to an area with poor channel condition.

20 Claims, 7 Drawing Sheets

APPARATUS AND METHOD FOR UPLINK SCHEDULING IN A BROADBAND WIRELESS COMMUNICATION SYSTEM

CROSS-REFERENCE TO RELATED APPLICATION(S) AND CLAIM OF PRIORITY

This application claims the benefit under 35 U.S.C. §119 (a) of a Korean Patent Application filed in the Korean Intellectual Property Office on Feb. 5, 2007 and assigned Serial No. 2007-11510, the entire disclosure of which is hereby incorporated by reference.

TECHNICAL FIELD OF THE INVENTION

The present invention generally relates to a scheduling apparatus and method in a wireless communication system. More particularly, the present invention relates to an apparatus and method for uplink scheduling in a Broadband Wireless Access (BWA) system using Collaborative Spatial Multiplexing (CSM).

BACKGROUND OF THE INVENTION

In general, much of the developmental work of communication systems focused on voice service, and communication systems have also been developed to additionally provide data service and a variety of multimedia services beyond the voice service. The voice-oriented communication systems have not fulfilled increasing user demands concerning services due to a relatively narrow bandwidth and a high service charge. Moreover, the development of the communications industry and an increasing demand for Internet service have been a driving force behind the need for a communication system that efficiently provides the Internet service. In this context, a BWA system has been proposed, for providing the Internet service efficiently in a broad band enough to satisfy the ever-increasing user demands. The BWA communication system is under standardization mainly in the Institute Electrical and Electronics Engineers (IEEE)802.16 working group.

As compared to conventional wireless technologies for voice service, owing to a broad band, the IEEE 802.16 standards enable transmission of more data for a shorter time and allow all users to share channels or resources, for efficient use of the channels or resources. In addition, since Quality of Service (QoS) is guaranteed, services with different QoS requirements can be provided to users according to the characteristics of their services.

The BWA system adopts Orthogonal Frequency Division Multiplexing/Orthogonal Frequency Division Multiple Access (OFDM/OFDMA) for physical channels. In OFDM/OFDMA, a physical channel signal is transmitted on a plurality of subcarriers, thus making high-speed data transmission possible. Meanwhile, the BWA system supports CSM by allowing two mobile stations to transmit uplink signals in the same resources.

Conventionally, an uplink scheduler prioritizes mobile stations and allocates radio resources first to a mobile station (MS) with the highest priority level. The scheduler also controls inter-cell interference to a predetermined level by adjusting a Modulation and Coding Scheme (MCS) through interference control. Without CSM, one slot is allocated to one MS and thus no interference exists within the same sector (or cell).

On the other hand, use of CSM causes intra-sector interference because two mobile stations use the same slot in different pilot patterns. What is worse, if a neighbor sector also uses CSM, interference from the neighbor sector increases twice. A conventional scheduler allocates resources to mobile stations using first and second pilot patterns irrespective of their locations. Hence, the same slot can be allocated to two mobile stations at a cell edge, thereby further increasing interference to other sectors.

When system load (e.g. Rise Over Thermal (RoT)) increases, the scheduler allocates a low MCS level to an MS in order to keep the load at an acceptable level. If the use of CSM increases the system load to or above a predetermined level, the scheduler decreases MCS levels for all mobile stations. In this case, even though CSM doubles the number of available slots, the overall system throughput decreases.

Table 1 compares Single Input Multiple Output (SIMO) with CSM in terms of system throughput (TP), RoT, and MCS level distribution.

TABLE 1

|  | SIMO | CSM |
| --- | --- | --- |
| TP | 1805159.90 | 1691563.29 |
| RoT | 5.01 | 5.50 |
| MCS distribution |  |  |
| QPSK 1/12 | 0 | 0 |
| QPSK 1/8 | 23275 | 318609 |
| QPSK 1/4 | 18593 | 48972 |
| QPSK 1/2 | 202960 | 220537 |
| QPSK 3/4 | 0 | 0 |
| 16QAM 1/2 | 1606811 | 1685177 |
| 16QAM 3/4 | 547513 | 864248 |

As noted from Table 1, compared to SIMO, CSM increases RoT but decreases TP. When CSM is based on interference control, more of lower MCS levels are distributed than in SIMO.

As described above, if the CSM system performs scheduling in the conventional manner, system throughput decreases despite a twofold increase in available resources.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention provides an apparatus and method for increasing throughput and reducing inter-cell interference in a BWA system using CSM.

Another aspect of exemplary embodiments of the present invention provides an apparatus and method for reducing the probability of mobile stations at a cell edge being allocated the same resources in a BWA system using CSM.

A further aspect of exemplary embodiments of the present invention provides an apparatus and method for allocating resources fairly to a mobile station (MS) in poor channel condition in a BWA system using CSM.

Still another aspect of exemplary embodiments of the present invention provides an apparatus and method for increasing the ratio of mobile stations having high data rates in a BWA system using CSM.

In accordance with an aspect of exemplary embodiments of the present invention, there is provided an apparatus of a BS in a broadband wireless communication system, in which a prioritizer orders CSM mobile stations according to priority levels of the CSM mobile stations, and a resource allocator selects the CSM mobile stations sequentially according to the priority levels, determines pilot patterns for the selected CSM mobile stations according to channel information of the selected CSM mobile stations, and allocates resources of the determined pilot patterns to the selected CSM mobile stations.

In accordance with another aspect of exemplary embodiments of the present invention, there is provided a scheduling method in a broadband wireless communication system, in which CSM mobile stations are ordered according to priority levels of the CSM mobile stations, the CSM mobile stations are sequentially selected according to the priority levels, pilot patterns are determined for the selected CSM mobile stations according to channel information of the selected CSM mobile stations, and resources of the determined pilot patterns are allocated to the selected CSM mobile stations.

In accordance with a further aspect of exemplary embodiments of the present invention, there is provided a scheduling method in a broadband wireless communication system, in which channel conditions are divided into at least two areas, an area corresponding to channel information of a CSM mobile station received from the CSM mobile station is determined, resources of a first pilot pattern are allocated to the CSM mobile station, if the channel information belongs to an area with good channel condition, and resources of a second pilot pattern are allocated to the CSM mobile station, if the channel information belongs to an area with poor channel condition.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems.

Exemplary embodiments of the present invention provide a method for increasing throughput and decreasing inter-cell interference in a BWA system using CSM.

Figure 1:
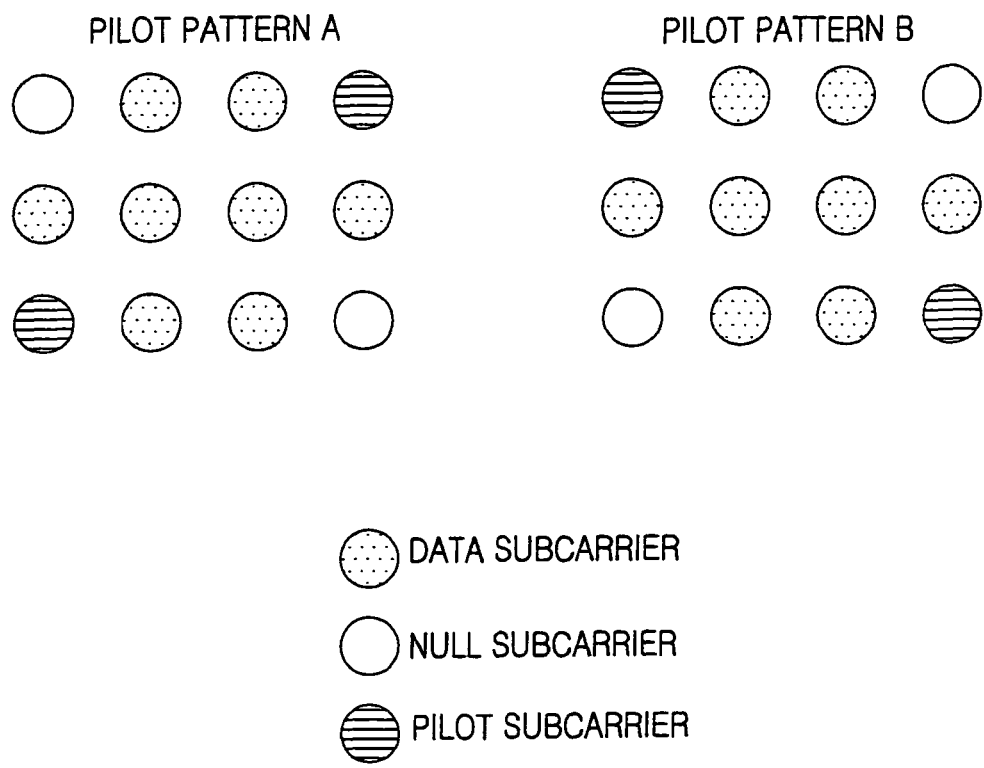
FIG. 1 illustrates a typical CSM tile structure.

FIG. 1 illustrates a typical CSM tile structure.

Referring to FIG. 1, one tile includes four successive sub-carriers (or tones) in frequency and three OFDM symbols in time. That is, one tile is comprised of 12 tones (4 tones×3 OFDM symbols) in total. Eight tones out of the 12 tones are data tones and the remaining four tones are pilot tones. The pilot tones carry a predetermined signal (i.e., pilot signal) known to a BS and an MS and their positions are preset. One Partial Usage SubChannel (PUSC) subchannel has a total of six tiles.

Meanwhile, the PUSC subchannel allows for CSM. CSM is a technology in which two mobile stations transmit different data in the same resources and a BS detects the different data by Multiple Input Multiple Output (MIMO) detection. One of the two mobile stations uses pilot pattern A and the other MS uses pilot pattern B.

Figure 2:
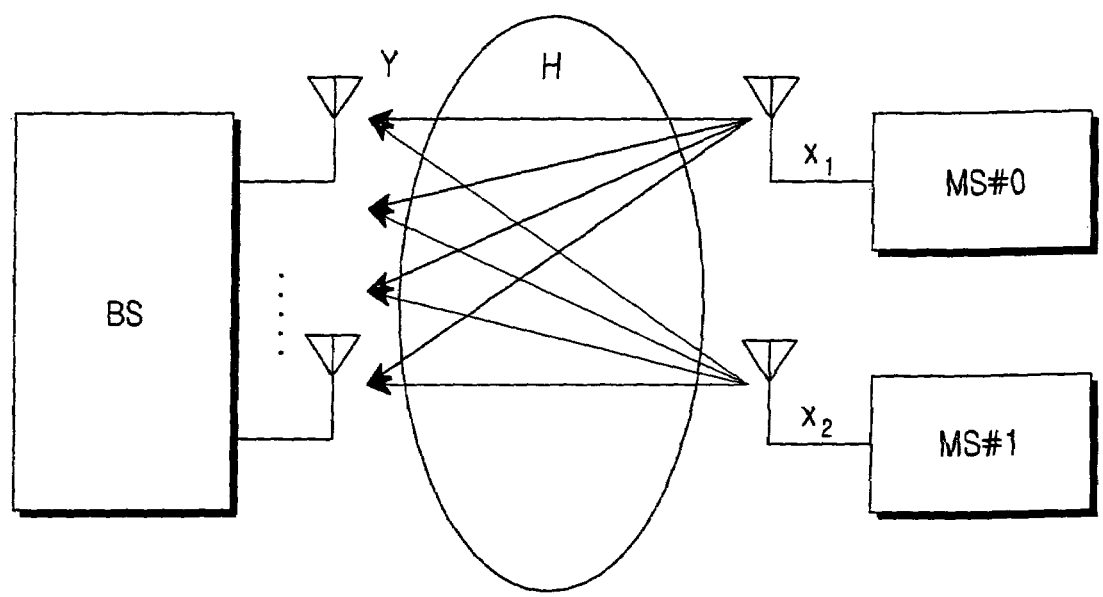
FIG. 2 illustrates the concept of CSM according to the present invention.

FIG. 2 illustrates the concept of CSM according to the present invention.

Referring to FIG. 2, one BS and a plurality of mobile stations, MS #0 and MS #1 form a virtual MIMO environment. As each of the mobile stations is considered a virtual transmit antenna, a MIMO environment with two transmit antennas and Nr receive antennas is formed. Since the mobile stations transmit different data, the transmitters operate in Spatial Multiplexing (SM) and a receiver (i.e. a BS) detects the different data by MIMO detection.

When a PUSC subchannel is used in CSM mode, the four pilot tones of each tile are distributed, two pilot tones to each of the two mobile stations and the data tones are shared between the two mobile stations.

The present invention is intended to reduce inter-cell interference, increasing throughput in the CSM mode. For this purpose, the present invention divides a cell (or a sector) into a plurality of areas based on the average CQIs of mobile stations.

Figure 3:
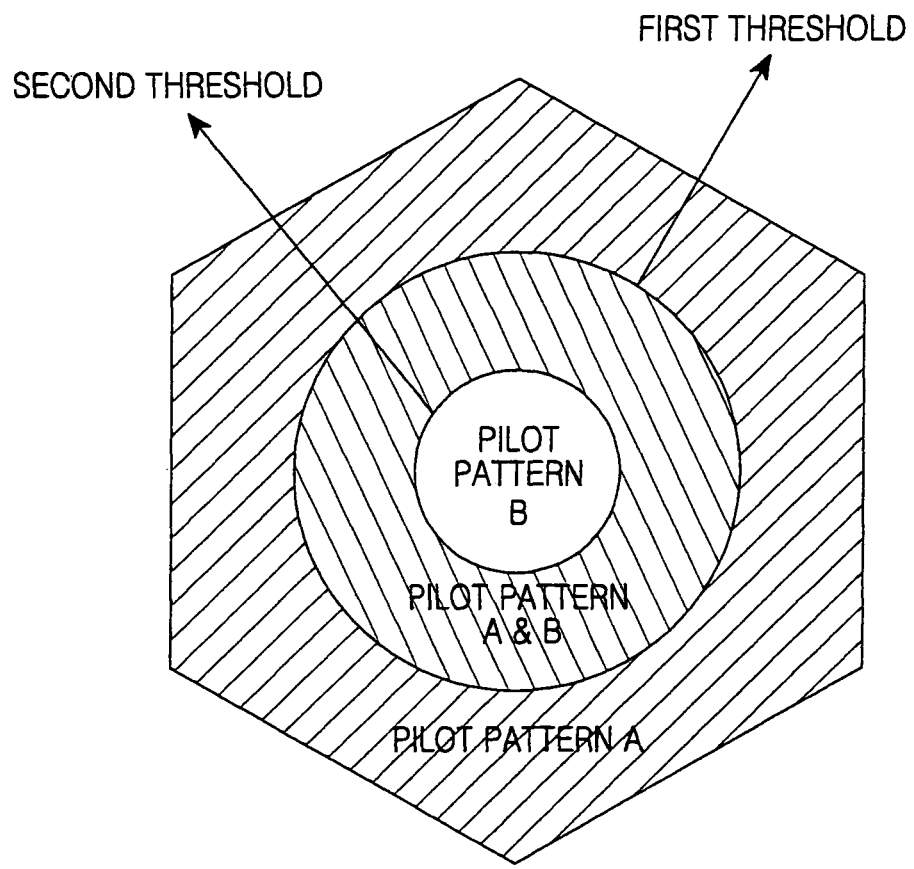
FIG. 3 illustrates the configuration of a cell divided into a plurality of areas according to the average Channel Quality Indicators (CQIs) of mobile stations in a BWA system according to an exemplary embodiment of the present invention.

FIG. 3 illustrates the configuration of a cell divided into a plurality of areas according to the average CQIs of mobile stations in a BWA system according to an exemplary embodiment of the present invention.

Referring to FIG. 3, a cell is divided into three areas, a first, a second and a third areas based on the average CQIs (or Carrier to Interference and Noise Ratios (CINRs)) of mobile stations. Only pilot pattern B is available in the first area, both pilot patterns A and B in the second area, and only pilot pattern A in the third area.

If the average CQIs of mobile stations are larger than a second threshold, the mobile stations belong to the first area and pilot pattern B are allocated to these mobile stations in a good channel condition. mobile stations with average CQIs larger than a first threshold and less than the second threshold belong to the second area and are allocated pilot pattern A or B. For mobile stations that have average CQIs less than the first threshold, i.e. are placed in a poor channel condition and thus belong to the third area, pilot pattern A is allocated.

In this manner, it is prevented that the same resources (or slot) are allocated to mobile stations which are in poor channel condition and thus should use all their transmit power. That is, interference to other cells or sectors can be kept to a predetermined level. Furthermore, the present invention can prevent concentrated slot allocation to mobile stations having high average CQIs and can increase the ratio of mobile stations with high data rates.

Figure 4:
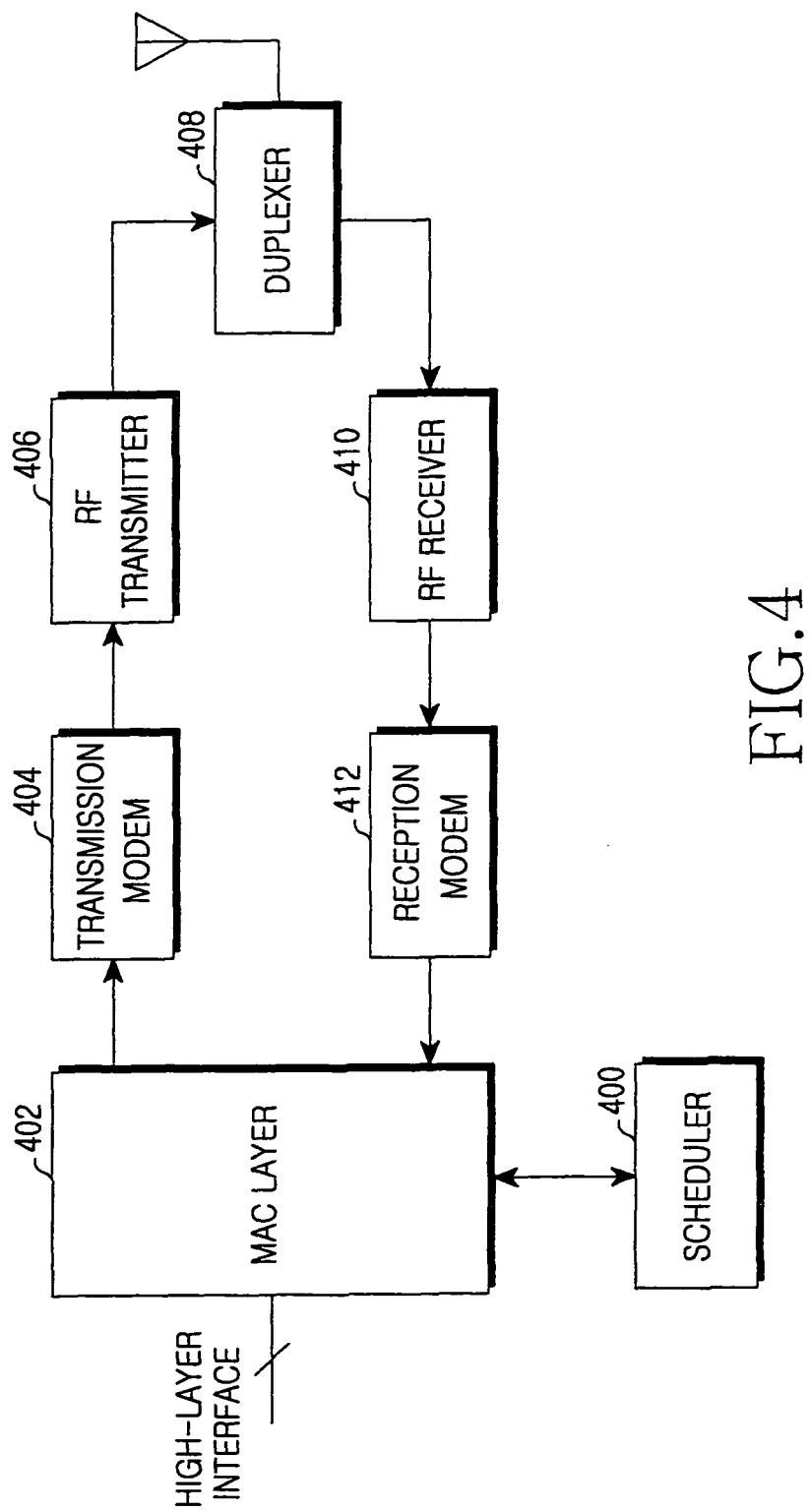
FIG. 4 is a block diagram of a Base Station (BS) in the BWA system according to an exemplary embodiment of the present invention.

FIG. 4 is a block diagram of a BS in the BWA system according to an exemplary embodiment of the present invention.

Referring to FIG. 4, the BS includes a scheduler 400, a Medium Access Control (MAC) layer 402, a transmission modem 404, a Radio Frequency (RF) transmitter 406, a duplexer 408, an RF receiver 410, and a reception modem 412.

In operation, the scheduler 400 schedules downlink and uplink resources and provides the result of the scheduling to the MAC layer 402. The MAC layer 402 generates a resource allocation message (e.g. a MAP message) based on the scheduling result and provides the resource allocation message to the transmission modem 404.

When CSM is used according to the present invention, the scheduler 400 orders mobile stations according to their priority levels and allocates resources (or slots) sequentially to the ordered mobile stations. At the same time, the scheduler 400 determines the areas to which the mobile stations belong according to their average CQIs in the cell configuration of FIG. 3 and allocates pilot patterns corresponding to the areas to the mobile stations. A detailed configuration and operation of the scheduler 400 will be described later with reference to FIGS. 5 and 6.

The MAC layer 402 receives transmission data from a higher layer (e.g. an Internet Protocol (IP) layer), processes the transmission data according to a connection scheme with the transmission modem 404. The MAC layer 402 processes data received through the reception modem 412 according to a connection scheme with the high layer and provides the processed data to the higher layer. The MAC layer 402 generates a transmission control message (e.g., a MAC management message) required for signaling and provides the transmission control message to the transmission modem 404. The MAC layer 402 also interprets a control message received through the reception modem 412.

The transmission modem 404 encodes the transmission data (i.e., burst data) received from the MAC layer 402 in the physical layer according to the downlink scheduling result. For example, the transmission modem 404 includes a channel encoding block and a modulation block and modulates the signal received from the MAC layer 402 in a baseband. The channel encoding block may include a channel encoder, an interleaver, and a modulator, and the modulation block may include an Inverse Fast Fourier Transform (IFFT) processor for mapping the transmission data on a plurality of orthogonal subcarriers.

The RF transmitter 406, including a frequency converter and an amplifier, upconverts the baseband signal received from the transmission modem 404 to an RF signal. The duplexer 408 transmits the RF signal received from the RF transmitter 406 through an antenna in a duplexing manner and provides a signal received through the antenna to the RF receiver 410. In a Time Division Duplexing (TDD) system, the duplexer 408 is synchronized to frame timing. During a transmission period, the duplexer 408 transmits the signal received from the RF transmitter 406 through the antenna, and during a reception period, it provides a signal received through the antenna to the RF receiver 410.

The RF receiver 410 converts the RF signal received from the duplexer 408 to a baseband digital signal. The reception modem 412 may include a demodulation block and a channel decoding block. In an OFDM system, the demodulation block may have a Fast Fourier Transform (FFT) processor for extracting data from each subcarrier, and the channel decoding block may include a demodulator, a deinterleaver, and a channel decoder.

Figure 5:
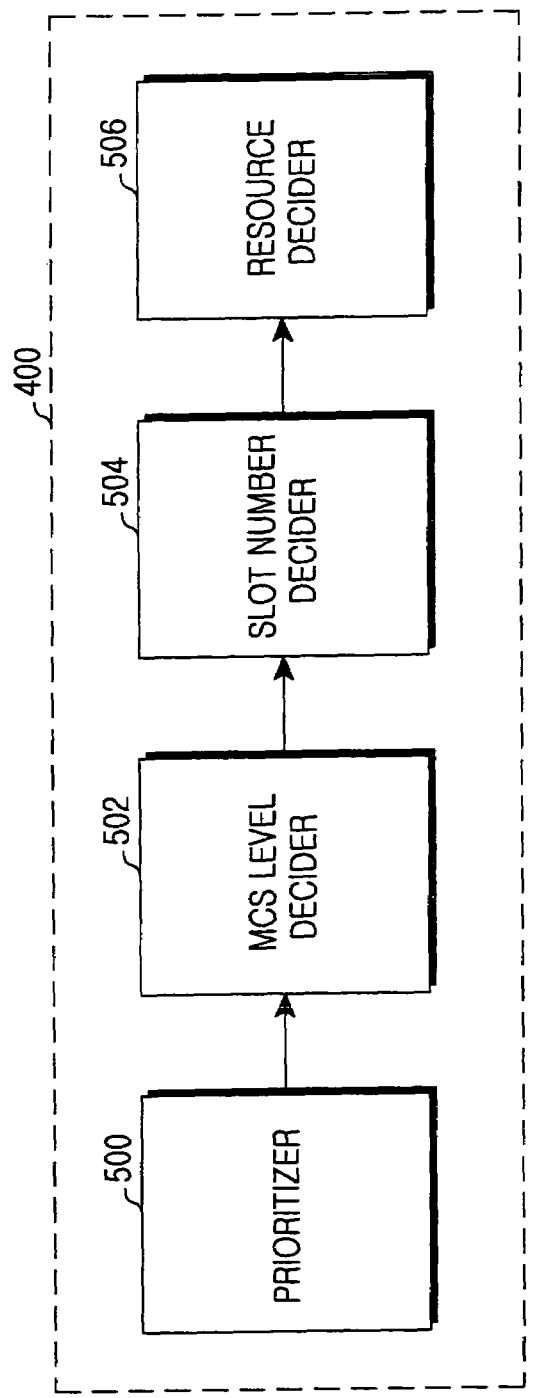
FIG. 5 is a detailed block diagram of a scheduler according to an exemplary embodiment of the present invention.

FIG. 5 is a detailed block diagram of the scheduler 400 according to an exemplary embodiment of the present invention.

Referring to FIG. 5, the scheduler 400 has a prioritizer 500, an MCS level decider 502, a slot number decider 504, and a resource allocator 506.

In operation, the prioritizer 500 prioritizes mobile stations that have requested uplink resources and orders the mobile stations according to their priority levels. The prioritization can be performed using the headrooms and data rates of the mobile stations.

The MCS level decider 502 determines MCS levels for the ordered mobile stations by interference control. The slot number decider 504 determines the number of slots to be allocated to each of the mobile stations. The number of slots can be determined according to the MCS level and requested bandwidth of the MS.

The prioritizer 500, the MCS level decider 502, and the slot number decider 504 can be implemented by a known scheduling method and thus their detailed description is not provided herein.

The resource allocator 506 determines pilot patterns for the mobile stations in a descending order of priority levels and allocates the resources (or slots) of the determined pilot patterns to the mobile stations. To do so, the resource allocator 506 determines the areas to which the mobile stations belong according to their average CQIs in the cell configuration of FIG. 3 and allocates pilot patterns corresponding to the areas to the mobile stations. A detailed description will be made of an operation of the resource allocator 506 with reference to FIG. 6.

Figure 6:
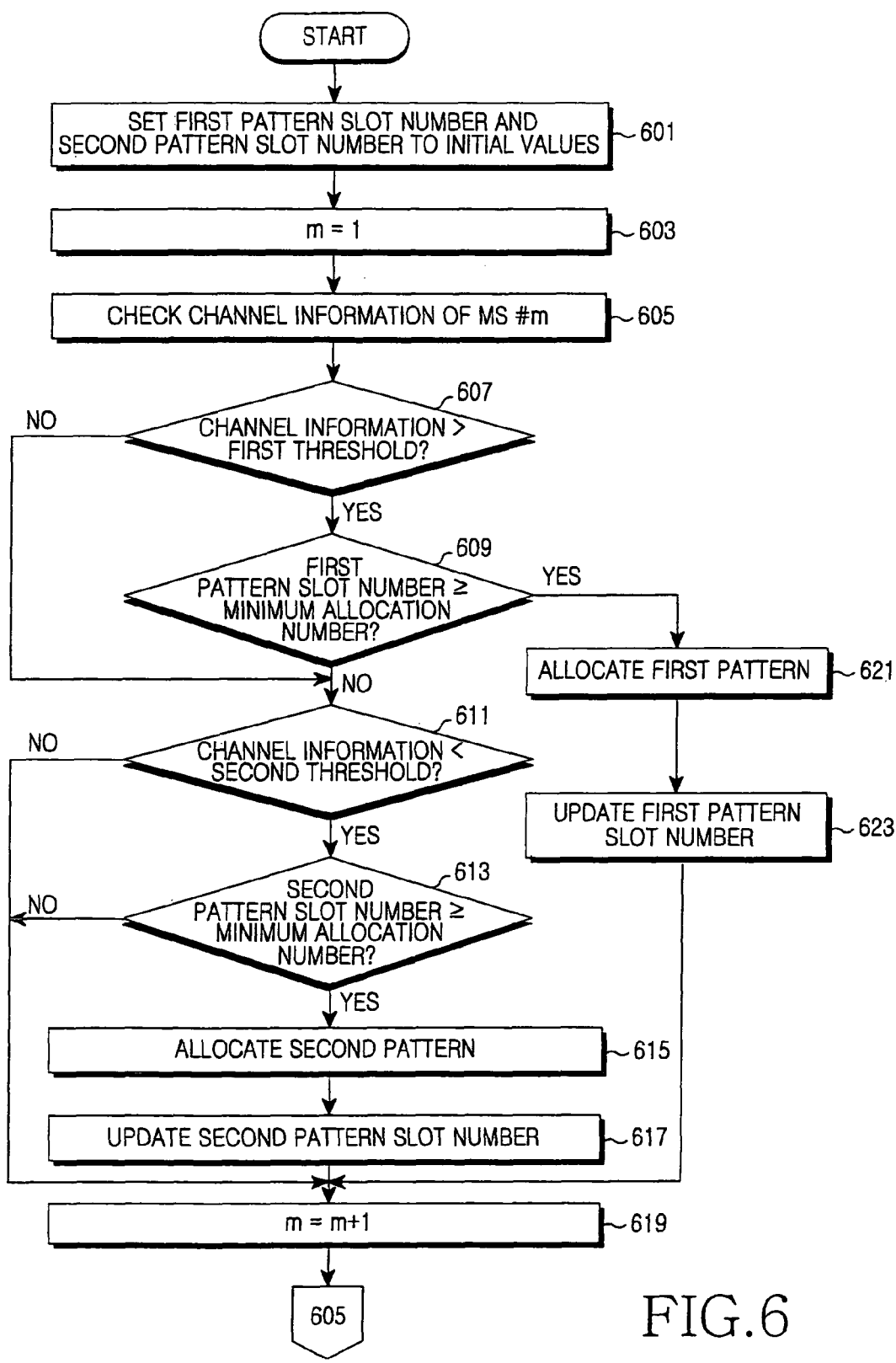
FIG. 6 is a flowchart illustrating an operation of the scheduler according to an exemplary embodiment of the present invention.

FIG. 6 is a flowchart illustrating an operation of the scheduler 400 according to an exemplary embodiment of the present invention.

Referring to FIG. 6, the scheduler 400 orders mobile stations according to their priority levels and determines MCS levels for the mobile stations. In step 601, the scheduler 400 sets a slot number for a first pattern (pilot pattern B) and a slot number for a second pattern (pilot pattern A) to initial values. These slot numbers are initially set to the same value indicating the total amount of resources (the total number of slots) available for CSM mobile stations in the system.

The scheduler 400 sets an MS index, m indicating the order of the ordered mobile stations to an initial value '1' in step 603. That is, an MS with the highest priority level is selected. In step 605, the scheduler 400 checks channel information (e.g., CQI) of MS #m.

In step 607, the scheduler 400 compares the channel information of MS #m with the first threshold depicted in FIG. 3. If the channel information is equal to or less than the first threshold, the scheduler 400 goes to step 611. If the channel information is larger than the first threshold, the scheduler 400 compares the first pattern slot number with a minimum allocation number in step 608. The minimum allocation number varies with an MCS level. In other words, a minimum number of slots for allocation remain for the first pattern.

If the first pattern slot number is equal to or larger than the minimum allocation number, the scheduler 400 allocates resources of the first pattern to MS #m in step 621. The number of slots allocated to MS #m can be determined using the MCS level and requested bandwidth of the MS. It is assumed that the number of slots has already been computed in the slot number decider 504 illustrated in FIG. 5.

After the first-pattern resources are allocated to MS #m, the scheduler 400 subtracts the number of slots allocated to MS #m from the first pattern slot number, thus updating the first pattern slot number in step 623. Then, the scheduler 400 proceeds to step 619 to select an MS with the next priority level.

Meanwhile, if the first pattern slot number is less than the minimum allocation number in step 609, which implies that resources of the first pattern are not available, the scheduler 400 compares the channel information of MS #m with the second threshold depicted in FIG. 3 in step 611. If the channel information of MS #m is equal to or larger than the second threshold, the scheduler 400 proceeds to step 619 to select an MS with the next priority level.

If the channel information of MS #m is less than the second threshold, the scheduler 400 compares the second pattern slot number with the minimum allocation number in step 613. The minimum allocation number varies with an MCS level. In other words, the scheduler 400 determines whether a minimum number of slots are available for the second pattern. If the second pattern slot number is less than the minimum allocation number, the scheduler 400 proceeds to step 619 to select an MS with the next priority level.

If the second pattern slot number is equal to or larger than the minimum allocation number, the scheduler 400 allocates resources of the second pattern to MS #m in step 615. The number of slots allocated to MS #m can be determined using the MCS level and requested bandwidth of the MS.

After the second-pattern resources are allocated to MS #m, the scheduler 400 subtracts the number of slots allocated to MS #m from the second pattern slot number, thus updating the second pattern slot number in step 617. Then, the scheduler 400 increases the MS index m by 1 in step 619 and returns to step 605.

In the above-described exemplary embodiment of the present invention, resources are allocated to individual mobile stations with no regard to coupling. Thus, it can be further contemplated as another exemplary embodiment of the present invention that a pilot pattern is decided for each MS and then resources are allocated to the MS, taking coupling into account. The coupling is a process of selecting two mobile stations using the same resources.

Simulated results of the performance of the present invention are given as follows.

Table 2 illustrates performances when the first and second thresholds are changed.

TABLE 2

| second threshold | | first threshold | | |
|---|---|---|---|---|
| | | 6 (dB) | 9 | 12 |
| 6 (dB) | TP | 1639978.57 | | |
| | RoT | 5.55 | | |
| 9 | TP | 1726898.69 | 2073925.55 | |
| | RoT | 5.47 | 5.17 | |
| 12 | TP | 1759775.52 | 2089240.70 | 2437111.40 |
| | RoT | 5.42 | 5.15 | 5.00 |
| 15 | TP | 1775141.58 | 2093807.09 | 2436223.87 |
| | RoT | 5.43 | 5.15 | 5.00 |

TABLE 2-continued

| second threshold | | first threshold | | |
|---|---|---|---|---|
| | | 6 (dB) | 9 | 12 |
| 18 | TP | | 2094366.23 | 2437424.81 |
| | RoT | | 5.15 | 5.00 |

A comparison between the simulated results illustrated in Table 2 and SIMO illustrated in Table 1 reveals that when the first threshold is 12 dB, TP increases and RoT is the same as that of SIMO. That is, empirical optimization of the first and second thresholds can lead to an increase in system throughput and a decrease in inter-cell interference.

Figure 7:
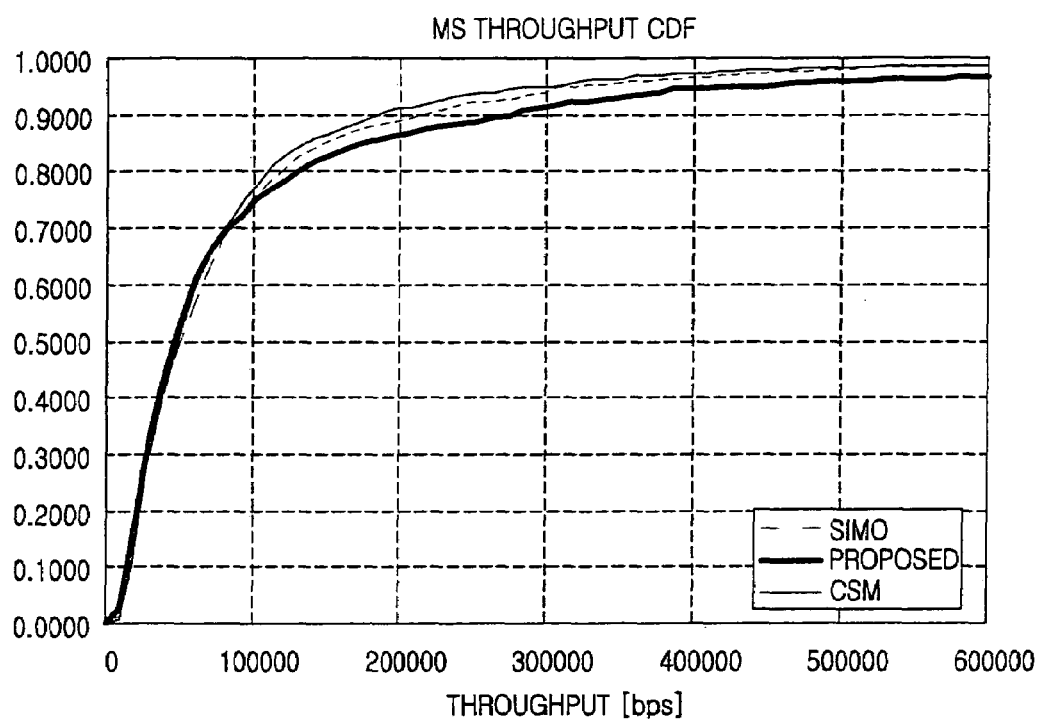
FIG. 7 is a graph comparing conventional technologies with the present invention in terms of performance.

FIG. 7 is a graph comparing conventional technologies with the present invention in terms of performance.

Referring to FIG. 7, "SIMO" is a case of not using CSM, "CSM" is a case of using a conventional scheduling scheme, and "Proposed" is a case of using the scheduling scheme of the present invention. The graph represents a cumulative density function of throughput. As noted from the graph, the present invention increases the ratio of mobile stations with high data rates, compared to the conventional technologies.

As is apparent from the above description, the present invention advantageously prevents mobile stations in poor channel condition from being allocated the same resources (or slots), thereby reducing interference to other cells or sectors. Further, the present invention can prevent concentrated slot allocation to mobile stations with high average CQIs and increase the ratio of mobile stations with high data rates.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus of a Base Station (BS) in a broadband wireless communication system, the apparatus comprising:
    a prioritizer configured to order Collaborative Spatial Multiplexing (CSM) mobile stations according to priority levels of the CSM mobile stations; and
    a resource allocator configured to select the CSM mobile stations sequentially according to the priority levels, determine pilot patterns for the selected CSM mobile stations according to channel information of the selected CSM mobile stations, and allocate resources of the determined pilot patterns to the selected CSM mobile stations,
    wherein the resource allocator is further configured to determine whether an amount of remaining resources available for a first pilot pattern is larger than an amount of minimum allocation resources, if the channel information of a selected CSM mobile station is larger than a first threshold; and allocate resources of the first pilot pattern to the selected CSM mobile station, if the amount of remaining resources are available.

2. The apparatus of claim 1, wherein the channel information of the selected CSM mobile stations includes channel quality indicators fed back from the selected CSM mobile stations.

3. The apparatus of claim 1, wherein the resource allocator is further configured to divide channel conditions into three areas, and if a selected CSM mobile station belongs to a first area with a good channel condition, the resource allocator is further configured to allocate the first pilot pattern to the selected CSM mobile station, if a selected CSM mobile station belongs to a third area with a poor channel condition, the resource allocator is further configured to allocate a second pilot pattern to the selected CSM mobile station, and if a selected CSM mobile station belongs to a second area with a medium channel condition, the resource allocator is further configured to allocate one of the first and second pilot patterns to the selected CSM mobile station.

4. The apparatus of claim 1, further comprising:
a Medium Access Control (MAC) layer configured to generate an uplink MAP message based on a resource allocation result of the resource allocator; and
a transmitter configured to transmit the uplink MAP message received from the MAC layer to the CSM mobile stations.

5. The apparatus of claim 1, wherein the resource allocator is further configured to allocate the first pilot pattern to CSM mobile stations in a good channel condition and a second pilot pattern to CSM mobile stations in a poor channel condition.

6. A scheduling method in a broadband wireless communication system, the method comprising:
ordering Collaborative Spatial Multiplexing (CSM) mobile stations according to priority levels of the CSM mobile stations;
selecting the CSM mobile stations sequentially according to the priority levels;
determining pilot patterns for the selected CSM mobile stations according to channel information of the selected CSM mobile stations; and
allocating resources of the determined pilot patterns to the selected CSM mobile stations, wherein allocating the resources comprises:
determining whether an amount of remaining resources available for a first pilot pattern is larger than an amount of minimum allocation resources, if the channel information of a selected CSM mobile station is larger than a first threshold; and
allocating resources of the first pilot pattern to the selected CSM mobile station, if the amount of remaining resources available for the first pilot pattern is larger than the amount of minimum allocation resources.

7. The scheduling method of claim 6, wherein allocating the resources comprises:
dividing channel conditions into three areas and determining areas corresponding to the channel information of the CSM mobile stations;
allocating resources of the first pilot pattern to a selected CSM mobile station, if the selected CSM mobile station belongs to a first area;
allocating resources one of the first pattern and a second pattern to a selected CSM mobile station, if the selected CSM mobile station belongs to a second area; and
allocating resources of the second pilot pattern to a selected CSM mobile station, if the selected CSM mobile station belongs to a third area.

8. The scheduling method of claim 6, wherein allocating the resources further comprises:
determining whether the channel information of the selected CSM mobile station is less than a second threshold or larger than the first threshold, if the channel information of the selected CSM mobile station is less than the first threshold or if the amount of remaining resources available for the first pilot pattern is less than the amount of minimum allocation resources;
determining whether an amount of remaining resources available for a second pilot pattern is larger than the amount of minimum allocation resources, if the channel information of the selected CSM mobile station is less than the second threshold; and
allocating resources of the second pilot pattern to the selected CSM mobile station, if the amount of remaining resources available for the second pilot pattern is larger than the amount of minimum allocation resources.

9. The scheduling method of claim 8, wherein allocating the resources further comprises:
skipping resource allocation for the selected CSM mobile station, if the channel information of the selected CSM mobile station is larger than the second threshold or if the amount of remaining resources available for the second pilot pattern is less than the amount of minimum allocation resources.

10. The scheduling method of claim 6, wherein the amount of minimum allocation resources varies with a modulation and coding scheme level.

11. The scheduling method of claim 6, wherein the channel information of the selected CSM mobile stations is channel quality indicators fed back from the selected CSM mobile stations.

12. The scheduling method of claim 6, wherein allocating the resources comprises:
dividing channel conditions into at least two areas;
allocating the first pilot pattern to CSM mobile stations which belong to an area with a good channel condition; and
allocating a second pilot pattern to CSM mobile stations which belong to an area with a poor channel condition.

13. A scheduling method in a broadband wireless communication system, the method comprising:
dividing channel conditions into at least two areas;
determining an area corresponding to channel information of a Collaborative Spatial Multiplexing (CSM) mobile station received from the CSM mobile station;
allocating resources of a first pilot pattern to the CSM mobile station, if the channel information belongs to an area with a good channel condition, wherein allocating the resources of the first pilot pattern comprises:
determining whether an amount of remaining resources available for the first pilot pattern is larger than an amount of minimum allocation resources, if the channel information of a selected CSM mobile station is larger than a first threshold; and
allocating resources of the first pilot pattern to the selected CSM mobile station, if the amount of remaining resources are available; and
allocating resources of a second pilot pattern to the CSM mobile station, if the channel information belongs to an area with a poor channel condition.

14. The scheduling method of claim 13, wherein the channel information is an average Channel Quality Indicator.

15. The scheduling method of claim 13, wherein the amount of minimum allocation resources varies with a modulation and coding scheme level.

16. The apparatus of claim 1, wherein the resource allocator is further configured to:
determine whether the channel information of the selected CSM mobile station is less than a second threshold or larger than the first threshold, if the channel information of the selected CSM mobile station is less than the first threshold or if the amount of remaining resources available for the first pilot pattern is less than the amount of minimum allocation resources;
determine whether an amount of remaining resources available for a second pilot pattern is larger than the amount of minimum allocation resources, if the channel information of the selected CSM mobile station is less than the second threshold; and allocate resources of the second pilot pattern to the selected CSM mobile station, if the amount of remaining resources available for the second pilot pattern is larger than the amount of minimum allocation resources.

17. The apparatus of claim 1, wherein the amount of minimum allocation resources varies with a modulation and coding scheme level.

18. The scheduling method of claim 6, wherein the channel information is an average Channel Quality Indicator.

19. The apparatus of claim 16, wherein the resource allocator is further configured to skip resource allocation for the selected CSM mobile station, if the channel information of the selected CSM mobile station is larger than the second threshold or if the amount of remaining resources available for the second pilot pattern is less than the amount of minimum allocation resources.

20. The apparatus of claim 1, wherein the channel information is an average Channel Quality Indicator.

* * * * *